US006667731B2

(12) United States Patent
Park

(10) Patent No.: US 6,667,731 B2
(45) Date of Patent: Dec. 23, 2003

(54) METHOD FOR DRIVING BACKLIGHT PARTS IN A MOBILE PHONE

(75) Inventor: Jae-Sun Park, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 182 days.

(21) Appl. No.: 09/829,635

(22) Filed: Apr. 10, 2001

(65) Prior Publication Data

US 2002/0021276 A1 Feb. 21, 2002

(30) Foreign Application Priority Data

Aug. 19, 2000 (KR) ........................................ 2000-48159

(51) Int. Cl.⁷ ................................................. G09G 3/36
(52) U.S. Cl. ......................................... 345/102; 455/566
(58) Field of Search ................................. 345/102, 211; 455/566, 575, 572, 575.3, 343.5, 158.4, 159.1, 550

(56) References Cited

U.S. PATENT DOCUMENTS 6,278,887 B1 * 8/2001 Son et al. .................... 455/566
6,463,304 B2 * 10/2002 Smethers .................... 455/566
6,480,377 B2 * 11/2002 Genest et al. ............... 361/686

* cited by examiner

*Primary Examiner*—Amare Mengistu
(74) *Attorney, Agent, or Firm*—Dilworth & Barrese, LLP

(57) ABSTRACT

There is provided a control method for driving backlight parts to provide backlight to a display and a keypad in a mobile terminal. The display backlight part and the keypad backlight part are controlled to be selectively driven, according to the state of the cover and the presence or absence of key input data. Therefore, power dissipation caused by unnecessary operation of the backlights can be prevented.

6 Claims, 6 Drawing Sheets

METHOD FOR DRIVING BACKLIGHT PARTS IN A MOBILE PHONE

PRIORITY

This application claims priority to an application entitled "Control Method for Driving Backlight Parts in Mobile Phone" filed in the Korean Industrial Property Office on Aug. 19, 2000 and assigned Serial No. 2000-48159, the contents of which are hereby incorporated by reference.

BACKGROUND OF THE INVENTION

1. Field of the Invention

The present invention relates generally to a mobile phone, and in particular, to a control method for driving backlight parts to provide a backlight to a display and a keypad.

2. Description of the Related Art

In general, a mobile phone has a backlight function that allows a user to identify information on a display and keys on a keypad. Thus, the mobile phone includes a display backlight part for providing backlight to a display, such as an LCD (Liquid Crystal Display), and a keypad backlight part for providing backlight to the keypad. Typically, an EL (Electroluminescence Element) is used to display the backlight part and an LED (Light Emitting Diode) is used to display the keypad backlight part. The display backlight part and the keypad backlight part are driven, according to the state of the mobile phone.

FIG. 1 is a block diagram of a mobile phone, mainly illustrating parts related with driving backlight parts. Referring to FIG. 1, an RF (Radio Frequency) module 100 processes an RF signal and transmits/receives the RF signal under the control of a controller 106. A keypad 102 is provided with a plurality of digit keys and function keys and transmits data corresponding to key input to the controller 106. A cover monitor 104 senses the closing and opening of a flip cover or a folder cover and notifies the controller 106 of the cover state. The controller 106 turns ON or turns OFF a display backlight part 108 and a keypad backlight part 110, according to the key data received from the keypad 102, depending on the cover state data received from the cover monitor 104.

The method for driving the display backlight part 108 and the keypad backlight part 110 will be described in FIG. 2.

In step 200, the controller 106 determines whether key input data has been received or, if the cover is opened. Upon receipt of the key input data from the keypad 102, or upon receipt of information indicating that the cover has been opened from the cover monitor 104, the controller 106 turns ON both the display backlight part 108 and the keypad backlight part 110 in step 202. Hence, backlight is provided to a display (not shown) and the keypad 102. In this state, the controller 106 checks whether a predetermined time has elapsed in step 204. When the predetermined time has elapsed, the controller 106 turns OFF both the display backlight part 108 and the keypad backlight part 110 in step 206, thereby preventing power dissipation caused by the long ON-state of the display backlight part 108 and the keypad backlight part 110.

In the conventional control method, as described above, the display backlight part and the keypad backlight part are turned ON at the same time when a user presses a key or opens a flip or folder cover. However, in the case that the user intends to view an RSSI (Received Signal Strength Indicator) or time on the display, he often turns ON the display backlight part just by manipulating an external key like a volume key without opening the cover. In this case, due to the mechanism of simultaneously turning ON/OFF the display backlight part and the keypad backlight part, a backlight is unnecessarily provided to the keypad when the cover is closed.

In the case of a so-called dual folder-type mobile phone having two displays, one of them is disposed on the outer surface of its folder cover to allow a user to view the display, even if the folder cover is closed, and the other display is disposed in such a way that it can be seen only when the folder cover is opened. An RSSI or time is displayed on the outer display. However, a user sometimes manipulates an external key when he wants to view the RSSI or time without opening the folder cover in the dual folder-type mobile phone, as in a flip-type mobile phone and a folder-type mobile phone, having a single display. According to the above conventional method, both backlight parts for the outer display and the inner display are turned ON even though it is not necessary to turn ON the backlight part for the inner display.

Therefore, a backlight part that is unnecessarily turned ON increases power dissipation, and as a result the life of a battery decreases.

A need exists for a method and an apparatus that enables a folder or flip-type mobile communication terminal to decide if a backlight part or a keypad backlight part should be turned ON, so the power, of the mobile communication terminal, will not be dissipated.

SUMMARY OF THE INVENTION

It is, therefore, an object of the present invention to provide a method for driving backlight parts to prevent power dissipation caused by unnecessary operation of a display backlight part and a keypad backlight part in a mobile phone.

To achieve the above object, there is provided a method for driving backlight parts to provide a backlight to a display and a keypad in a mobile terminal. The display backlight part and the keypad backlight part are controlled to be selectively driven, according to the state of the cover and the presence or absence of key input data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
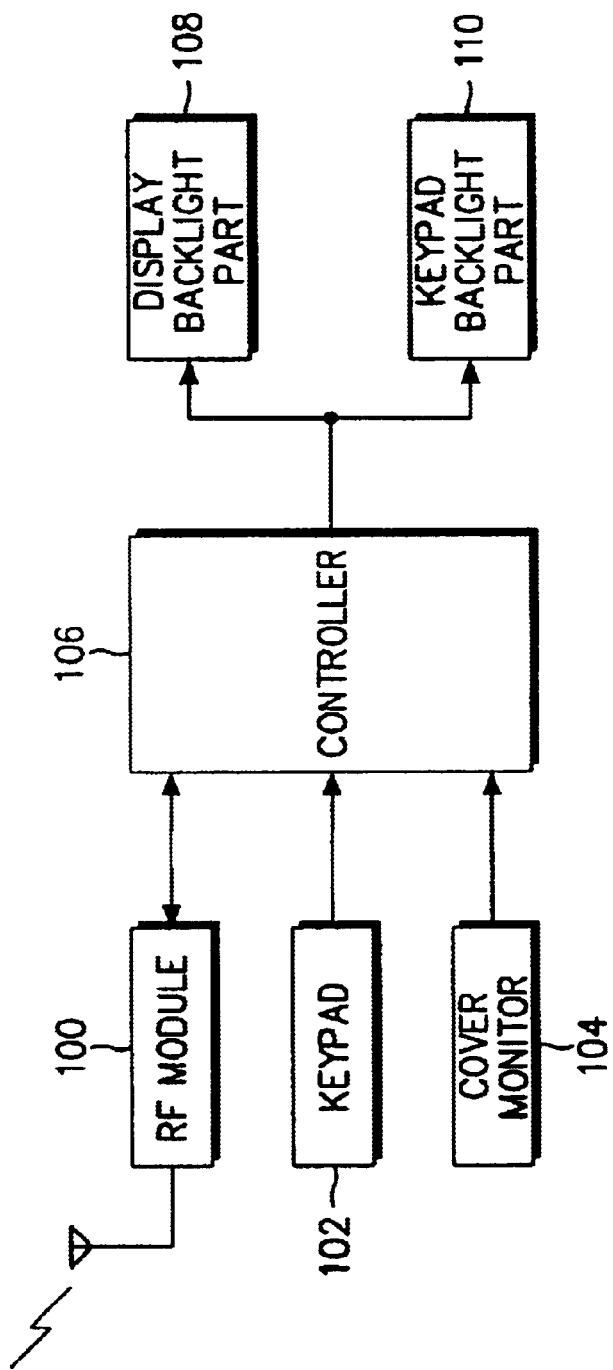
FIG. 1 is a block diagram of a conventional mobile phone, mainly illustrating components related to driving backlight parts.
Figure 2:
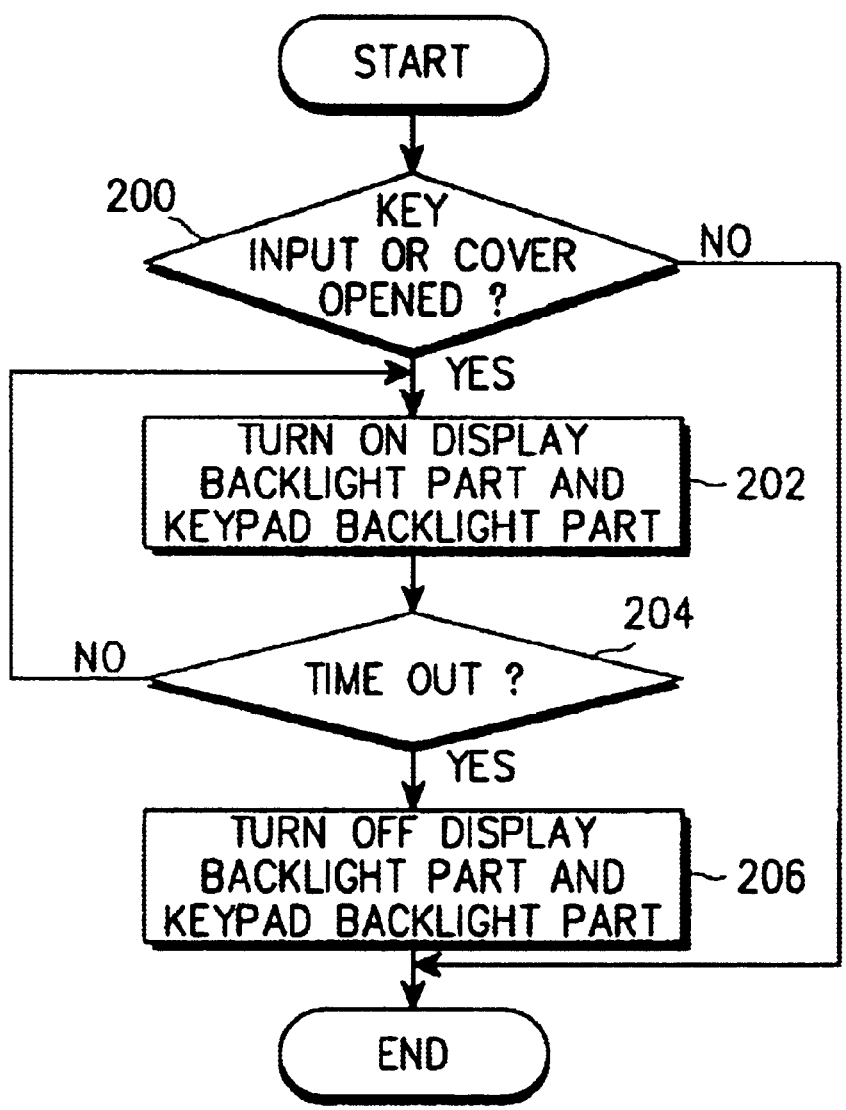
FIG. 2 is a flowchart illustrating a control operation for driving the backlight parts in the conventional mobile phone.
Figure 3:
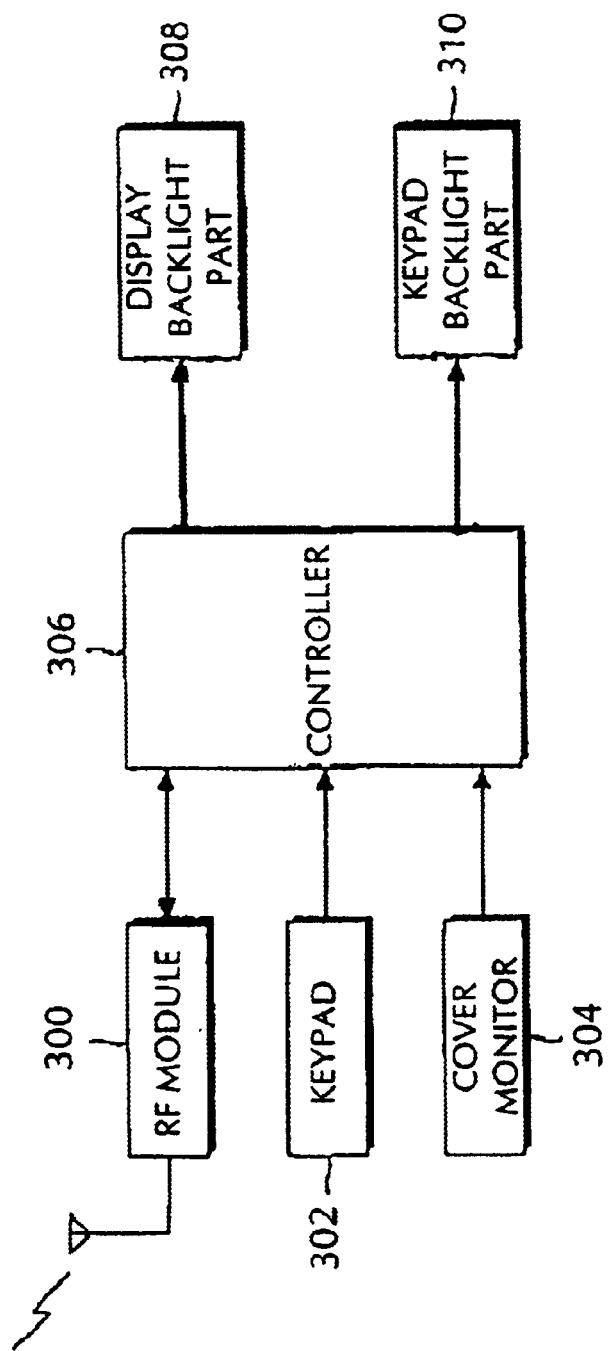
FIG. 3 is a block diagram of a mobile phone, mainly illustrating components related with control of driving backlight parts, according to an embodiment of the present invention.

FIG. 3 is a block diagram of a mobile phone that utilizes a method to control driving backlight parts according to an embodiment of the present invention. For a folder or flip-type mobile phone having a single display, a controller 306 selectively drives a display backlight part 308 and a keypad backlight part 310, as compared to the conventional mobile phone, shown in FIG. 1. An RF module 300, a keypad 302, and a cover monitor 304 are the same as their counterparts in FIG. 1.

Figure 4:
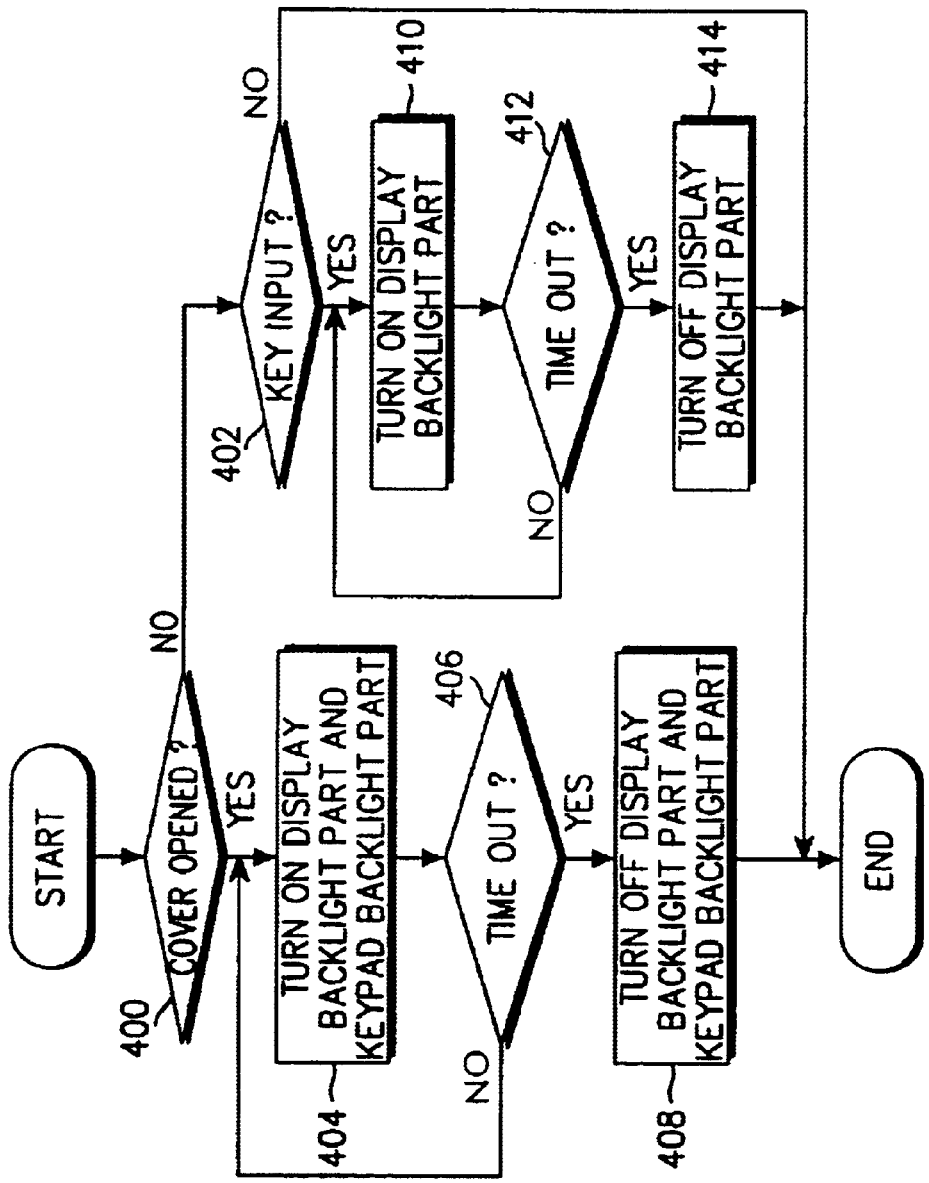
FIG. 4 is a flowchart illustrating a control operation for driving the backlight parts in the mobile phone, according to the embodiment of the present invention.

A control operation of driving the display backlight part 308 and the keypad backlight part 310 in the controller 306 will be described with reference to FIG. 4.

In step 400, the controller 306 checks whether a cover is open. If the controller 306 senses that the cover is open, through the cover monitor 304, it turns ON both the display backlight part 308 and the keypad backlight part 310 in step 404. Thus, a backlight is provided to a display (not shown) and the keypad 302 so that when the user opens the cover he can view the display or manipulate the keypad 302, conveniently, similarly to the conventional method. The controller 306 checks whether a predetermined time has elapsed in step 406. If the predetermined time has elapsed, the controller 306 turns OFF both the display backlight part 308 and the keypad backlight part 310 in step 408.

When the cover is not opened in step 400, the controller 306 checks whether key input data has been received from the keypad 302 in step 402. Upon receipt of the key input data, the controller 306 turns ON only the display backlight part 308 in step 410. Therefore, when the user presses an external key without opening the cover to see an RSSI or time on the display, that is, when there is key input with the cover closed, a backlight is provide only to the display backlight part 308, thereby saving power that is otherwise dissipated due to unnecessarily turning ON the keypad backlight part 310, as compared to the conventional method. In step 412, the controller 306 checks whether the predetermined time has elapsed. If the predetermined time has elapsed, the controller 306 turns OFF the display backlight part 308 in step 414.

Figure 5:
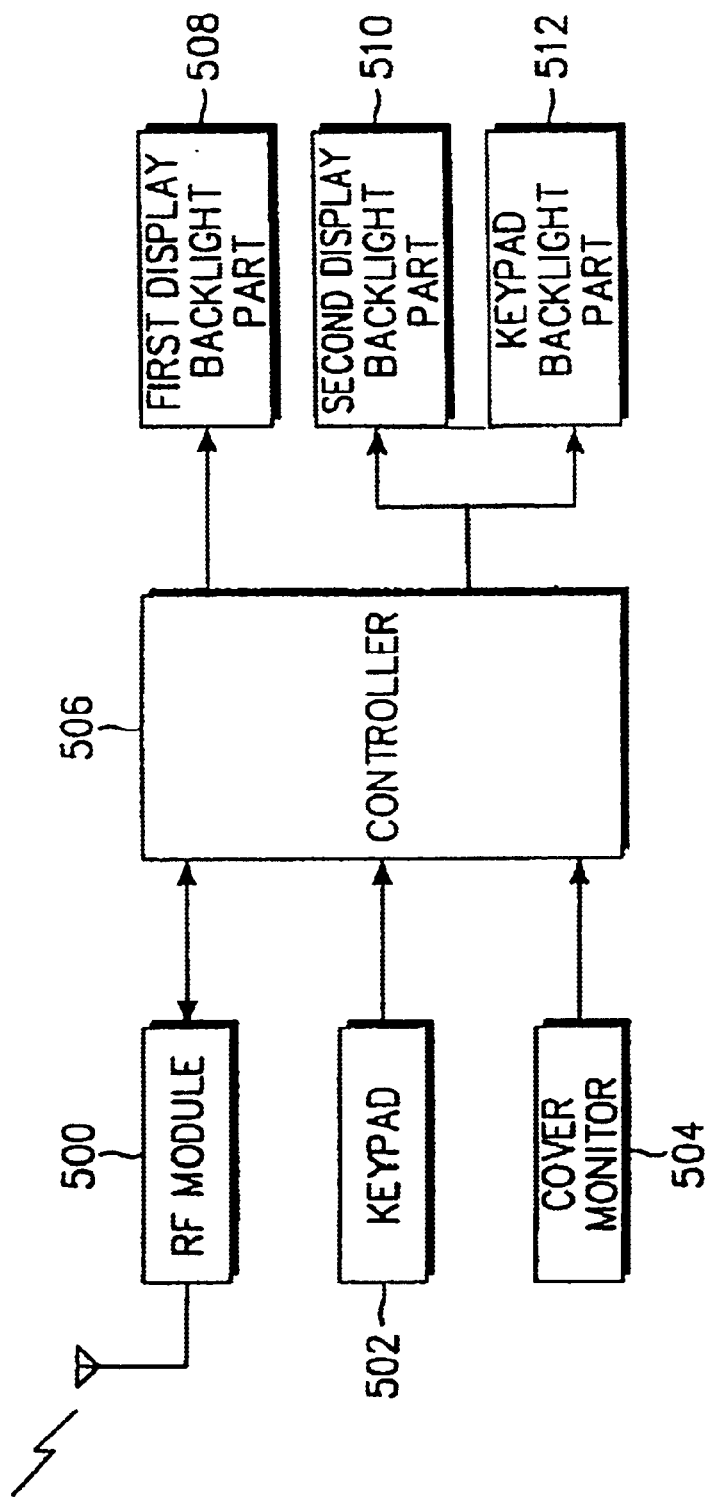
FIG. 5 is a block diagram of a mobile phone, mainly illustrating components related with control of driving backlight parts, according to another embodiment of the present invention.

FIG. 5 is a block diagram of a mobile phone that is utilized to control driving backlight parts, according to another embodiment of the present invention. For a dual folder-type mobile phone having two displays, a controller 506 selectively drives a first display backlight part 508, a second display backlight part 510, and a keypad backlight part 512. An outer display (not shown) installed on a folder cover is called "a first display" and an inner display (not shown) installed to be covered by the folder cover when the folder cover is closed is called "a second display." The first display backlight part 508 provides backlight to the first display and the second display backlight part 510 provides backlight to the second display. An RF module 500, a keypad 502, and a cover monitor 504 are the same as their counterparts in FIG. 3.

Figure 6:
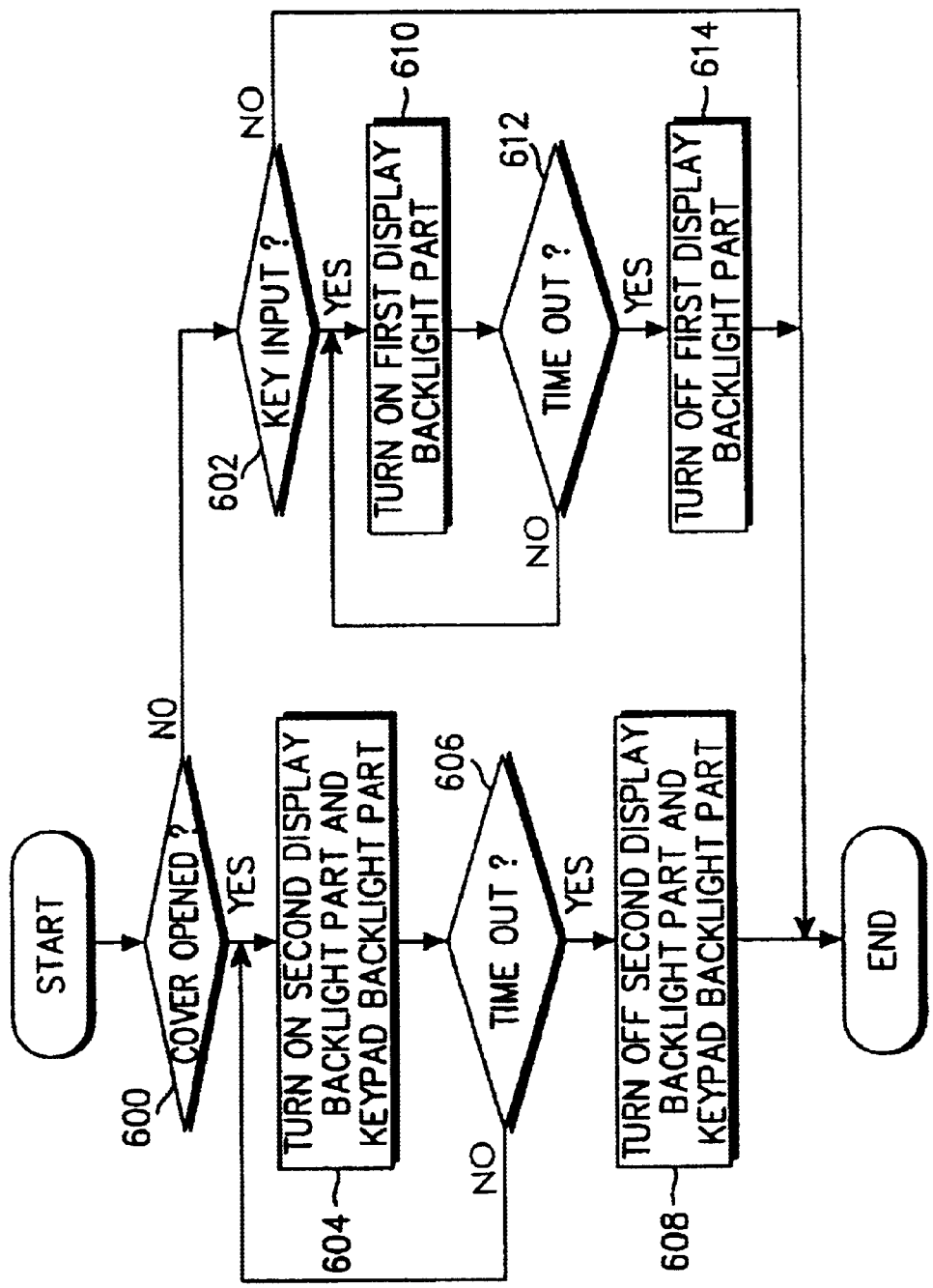
FIG. 6 is a flowchart illustrating a control operation for driving the backlight parts in the mobile phone, according to the second embodiment of the present invention.

A control operation of driving the first and second display backlight parts 508 and 510 and the keypad backlight part 512 in the controller 506 will be described with reference to FIG. 6.

In step 600, the controller 506 checks whether the folder cover is open. If the controller 506 senses that the cover is open, through the cover monitor 504, it turns on both the second display backlight part 510 and the keypad backlight part 512 in step 604. Thus, a backlight is provided to the second display and the keypad 502 so that when the user opens the cover he can view the second display or manipulate the keypad 502, conveniently. In this case, the first display is not turned ON unnecessarily. The controller 506 checks whether a predetermined time has elapsed in step 606. If the predetermined time has elapsed, the controller 506 turns OFF both the second display backlight part 510 and the keypad backlight part 512 in step 608. As an alternative embodiment, the controller controls all three separate backlight parts. Controller 506 can utilize a single control line to control first display backlight part 508, and utilize separate control lines to control second display backlight part 510 and keypad backlight part 512. For example, if first display backlight part 508 is turned ON, by controller 506, then second display backlight part 510 or keypad backlight part 512 can be turned ON or OFF, depending on controller 506.

When the cover is not opened in step 600, the controller 506 checks whether key input data has been received from the keypad 502 in step 602. Upon receipt of the key input data, the controller 506 turns ON only the first display backlight part 508 in step 610. Therefore, when the user presses an external key without opening the cover to see an RSSI or time on the first display, the backlight is provided only to the first display, thereby saving power that is otherwise dissipated due to unnecessarily turning ON the second display and the keypad backlight part 512. In step 612, the controller 506 checks whether the predetermined time has elapsed. If the predetermined time has elapsed, the controller 506 turns OFF the first display backlight part 508 in step 614.

In accordance with the embodiments of the present invention as described above, the display backlight parts and the keypad backlight part are selectively turned ON according to whether a cover is opened or closed and whether key input data has been received. Therefore, unnecessary power dissipation is prevented and the life of a battery can be increased.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A control method for driving backlight parts in a mobile phone, the method comprising:

providing a mobile phone having a display backlight part for providing backlight to a display, a keypad backlight part for providing backlight to a keypad, and a cover monitor for monitoring the state of a cover;

determining whether the cover is opened or closed;

determining whether key input data has been received from the keypad; and selectively controlling the state of the display backlight part and the state of the keypad backlight part that are selectively and independently driven, according to whether the state of the cover is determined to be opened or closed and the presence or absence of key input data, by:

turning ON both the display backlight part and the keypad backlight part when the cover is open; and turning ON only the display backlight part when key input data is received from the keypad while the cover is closed.

2. The control method of claim 1, wherein selectively controlling the display backlight part and the keypad backlight part, further comprises turning OFF a backlight part that was turned ON if a predetermined time elapses.

3. The control method of claim 1 wherein the cover is a folder cover.

4. The control method of claim 1 wherein the cover is a flip-type cover.

5. A control method for driving backlight parts in a dual folder-type mobile phone, the method comprising:

providing a mobile phone having a first display back light part for providing backlight to a first display installed on the outer surface of a folder cover, a second display back light part for providing backlight to a second display installed to be covered when the folder cover is closed, a keypad backlight part for providing backlight to a keypad, and a cover monitor for monitoring the state of the folder cover;

determining whether the cover is opened or closed;

determining whether key input data has been received from the keypad;

selectively controlling the state of the first and second display backlight parts and the keypad backlight part, according to whether the state of the cover is determined to be opened or closed and the presence or absence of key input data, by:

turning ON both the second display backlight part and the keypad backlight part when the cover is open; and turning ON only the first display backlight part when key input data is received from the keypad while the cover is closed; and independently driving the first and second display backlight parts and the keypad backlight part.

6. The control method of claim 5, wherein selectively controlling the first and second display backlight parts and the keypad backlight part, further comprises turning OFF a backlight part that was turned ON if a predetermined time elapses.

* * * * *